H. TUCKER.
Assignor, by mesne assignments, to THE BRADLEY AND HUBBARD MANUFACTURING CO., AND THE MERIDEN MALLEABLE IRON CO.
Extension Chandeliers.
No. 8,371. Reissued Aug. 13, 1878.
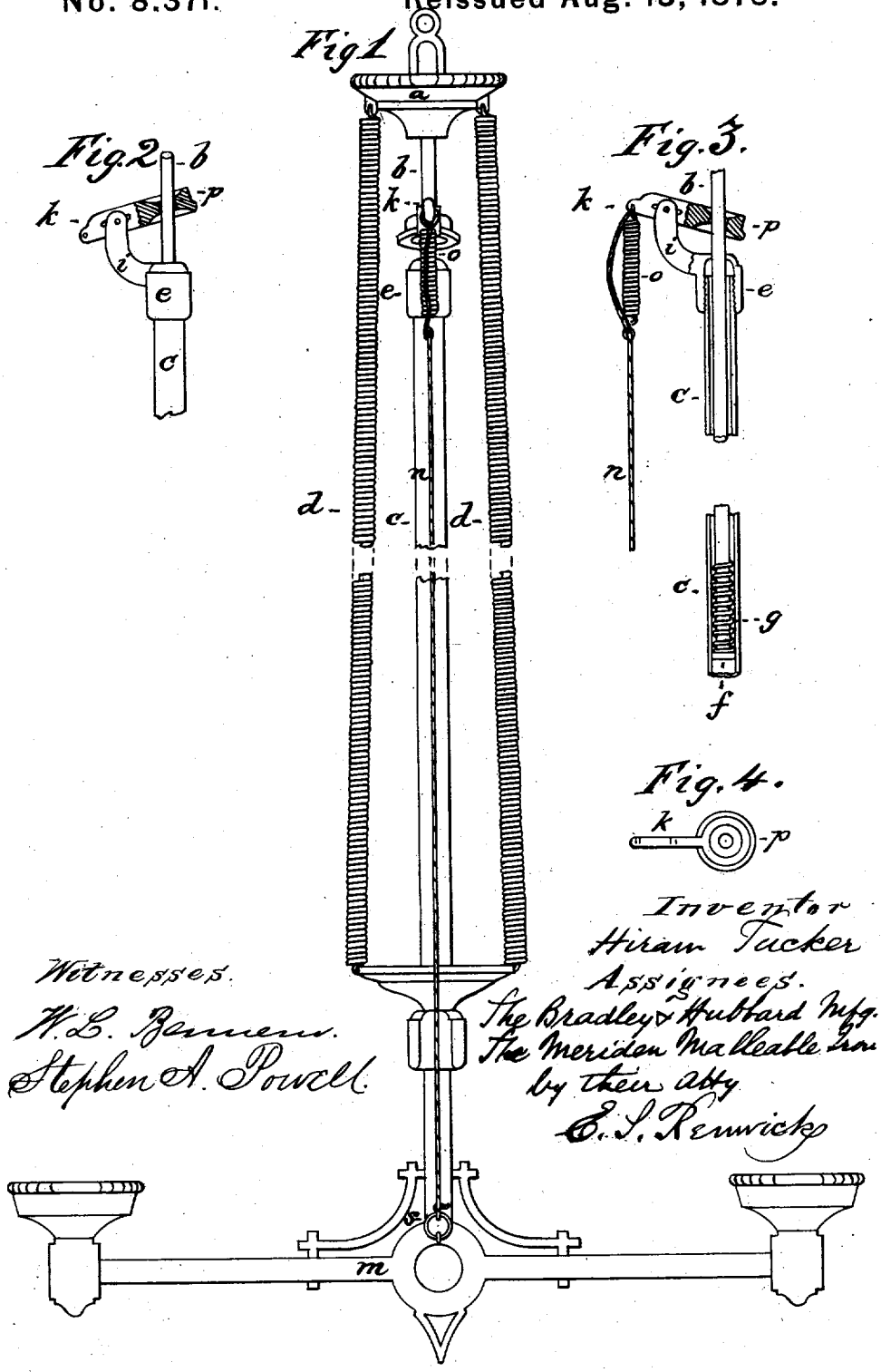
Witnesses.
W. L. Bennett.
Stephen A. Powell.
Inventor
Hiram Tucker
Assignees.
The Bradley & Hubbard Mfg. Co.
The Meriden Malleable Iron Co.
by their Atty
E. S. Renwick
N. PETERS, PHOTO-LITHOGRAPHER, WASHINGTON, D. C.

UNITED STATES PATENT OFFICE.

THE BRADLEY AND HUBBARD MANUFACTURING COMPANY AND THE MERIDEN MALLEABLE IRON COMPANY, OF MERIDEN, CONNECTICUT, ASSIGNEES, BY MESNE ASSIGNMENTS, OF HIRAM TUCKER.

IMPROVEMENT IN EXTENSION-CHANDELIERS.

Specification forming part of Letters Patent No. 93,927, dated August 17, 1869; Reissue No. 8,371, dated August 13, 1878; application filed July 24, 1878.

*To all whom it may concern:*

Be it known that HIRAM TUCKER, of Newton, in the county of Middlesex and State of Massachusetts, did invent an Improved Extension-Chandelier; and that the following, taken in connection with the drawings which accompany and form part of this specification, is a description of the said invention sufficient to enable those skilled in the art to practice it.

This invention relates to the means or devices, and to their combination and arrangement, by which a chandelier or other lamp or burner-carrying apparatus which is suspended may be raised or lowered within reasonable extreme limits, and locked or fastened in position at either of said limits or at any intermediate point.

Previous to this invention such chandelier or burner-carrying apparatus had been constructed with telescopic guides consisting of a central rod and a covering-tube, or of two telescopic tubes, one of which was connected with the ceiling and the other with the burner-carrier, so that the latter was guided laterally when it was raised or lowered. Such chandeliers or burner-carriers had also been provided with springs, by which the weight of their movable bodies was supported in whole or in part. In some of these cases, however, the spring was arranged horizontally in the space between the ceiling of the room and the floor above, which arrangement was objectionable because it required the removal and replacement of the ceiling to enable the chandelier to be set up, and also because it involved the use of a chain or cord and pulleys, by means of which the force of the horizontal spring could be transmitted to the burner-carrier. In other cases the spring or springs were made of india-rubber and arranged within the telescopic or covering tube of the telescopic guides of the chandelier. This construction and arrangement was objectionable for two reasons—first, because the springs were made of a decomposable material, so that they became deteriorated by age and gave way unexpectedly, and, second, because the inclosure of the spring or springs hampered their free action unless the telescopic covering-tube should be made of such large dimensions as to be unsightly.

The defects of these preceding plans were obviated by the invention which constitutes the subject of this patent, according to which the weight of the chandelier or burner-carrying apparatus is sustained, in whole or in part, by helical metallic springs arranged externally of both telescopic guides, and connected at their upper ends with the head or top piece for the stationary central guide rod or tube and at their lower ends with the burner-carrier. The springs thus arranged form a component part of the apparatus below the ceiling, and do not require the removal or replacement of the ceiling when the apparatus is set up. They also dispense with the employment of pulleys and chains or cords. On the other hand, the springs, being metallic, do not tend to decompose, and, being external of the covering telescopic tube, are free to act; and this tube need be made of no greater size than is sufficient for guiding the apparatus when it is raised and lowered. According to this invention, also, the burner-carrier, telescopic or extension guides, and external helical springs are combined with a securing device for locking or fastening the burner-carrier temporarily in any position in which it may be set by raising or lowering.

The drawings illustrate an embodiment of the said invention.

Figure 1 shows, in elevation, a chandelier embodying the invention, by which the lower or light or burner bearing portion can be raised and lowered and locked or fastened in any desirable position between the upper and lower extreme positions. Figs. 2 and 3 show sectional views of some of the details of construction and arrangement, and Fig. 4 shows a plan of the gripe or clamp employed to hold in any desired position the movable part of the chandelier.

The chandelier shown in the drawings is one adapted for using lamp-bodies or candles; but a description will subsequently be given of the manner in which it may be modified so as to adapt it to the use of gas.

To the pendent top piece *a* a central rod, *b*, is fixed, which is surrounded by a covering-tube, *c*, to which tube the arms, lower part, or body *m* of the chandelier are attached, on which lower part provision is made to receive lamps or candles. The rod *b* and the covering-tube *c* constitute the telescopic guides by which the body of the chandelier is guided when raised and lowered.

The top piece *a* projects beyond the sides of the central rod *b*, and the body *m* of the chandelier is connected with this projecting top piece *a* by closely-wound spiral springs *d*, so proportioned as to strength that, when the lower part of the chandelier is about midway between its extreme upper and lower positions, and the springs, in consequence, about half extended, the lower part or body and its burden of lamps and oil or other burning-fluid or candles will be nearly in a state of equilibrium.

In order to prevent too great play between the central rod *b* and the covering-tube *c*, the upper end of the covering-tube *c* is fitted with cap-piece *e*, closely surrounding the rod *b*, and guiding the covering-tube *c* as it is made to slide up and down on the rod *b*.

The central rod has a head *f*, at its lower end, above which is placed an open coiled spiral spring, *g*, which serves as a bumper-spring, and prevents a sudden shock or jar to the chandelier when the lower part is drawn down suddenly to its lower extreme point, the spring *g* in such case being compressed between the head *f* and that part of the cap *e* fitting closely around the rod *b*.

In the lower end of the covering-tube *c* may be placed another open coiled bumper-spring, (not shown in the drawings,) which spring so placed would prevent sudden stoppage and shock to the chandelier on arriving at its extreme upper point of movement.

The cap *e* has attached to it an arm or bracket, *i*, which serves as a support or fulcrum for the lever *k*, which is pivoted to said arm, the pivot-pin passing through a slot in the lever *k*, thus allowing to the lever a slight endwise movement.

The long arm of the lever terminates in a ring, *p*, which surrounds and embraces the rod *b*, and when canted acts as a gripe to prevent upward or downward movement of the lower part of the chandelier, according as the lever *k* is inclined upward or downward.

When the lever *k* is held horizontally its ring end ceases to act as a gripe, and leaves the body of the chandelier free to move up or down, as may be required.

When the long arm of lever *k* is inclined upward, as seen in Fig. 2, then the gripe of its ring end upon the rod *b* operates to prevent the descent of the body of the chandelier; and when the lever is in the position seen in Fig. 3, then the gripe of its ring end prevents the ascent of said body. The ring end *p* of the lever thus constitutes a fastening or locking device, by means of which the body of the chandelier can be fastened or secured in the desired position.

In order that this locking device may be conveniently operated, the pull *n* is provided. The upper end of this pull is attached to the short arm of the lever *k*, and its lower end terminates in a ring or handle, *s*, arranged at the level of the body of the chandelier, where it is in a convenient position to be moved by the hand for the purpose of shifting or controlling the position of the lever *k* and the operation of its gripe ring or clamp.

As the inner or longer arm of lever *k* is the heaviest, and tends to gravitate downward, provision is made to keep the lever in the position seen in Fig. 2, so that when the body of the chandelier is above its medium position as to height the position of the lever *k* shall not be accidentally changed, which would result in the fall or descent of the body of the chandelier. Said provision is as follows: In the pull *n* is inserted a spring, *o*, which, when the chandelier has been drawn downward and when the spring *o* has been extended and the pull secured by applying its ring-handle to a pin on the body of the chandelier, acts, on drawing the lower part of the chandelier slightly downward, to reverse the position of the lever from that seen in Fig. 3 to that seen in Fig. 2.

When the lever *k* is in the position seen in Fig. 2, then the chandelier is free to be moved upward, but is prevented from moving downward until such time as the lever *k* is purposely made to assume the position seen in Fig. 3.

When gas is to be burned, a gas-pipe takes the place of the rod *b*, and a stuffing-box or a water-joint is arranged in the cap-piece *e*, and the gas is caused to pass from the pipe to the burners in any manner now well known in gas-burning chandeliers.

To prevent undue extension of the spiral springs *d d* or *o*, cords may be applied, connecting their ends, the cords being preferably applied within the springs, so as to be concealed somewhat thereby, and being of such length as will permit the necessary extension of the springs, said cords, of course, being slack when the springs are not extended or but partially extended.

In the chandelier constructed as above set forth, the springs, being arranged externally of the covering-tube *c* and between the top piece *a* and the body *m* of the chandelier, can be readily put in place when the chandelier is set up. This arrangement of the springs also enables the covering-tube to be made of no larger dimensions than is required for other purposes. In the said chandelier, also, the ring end of the lever *k* constitutes the locking or fastening device, by means of which the movable body *m* of the chandelier can be locked or fastened in any desirable position; and the handle *s*, which operates this device, being in the vicinity of the body of the chandelier, is in a convenient position for the operator.

What is claimed as the invention of said TUCKER in extension-chandeliers is—

1. The combination, substantially as before set forth, of the body of the chandelier, the telescopic guides, and helical springs.

2. The combination, substantially as before set forth, of the body of the chandelier, the telescopic guides, the helical springs, and a securing device.

3. The combination, substantially as before set forth, of the body of the chandelier, the telescopic guides, the top piece, and the helical metallic springs, arranged externally of the covering-tube of the telescopic guides and between the projecting top piece and the body of the chandelier.

4. The combination, substantially as before set forth, of the body of the chandelier, the telescopic guides, the top piece, the locking device, and the helical metallic springs, arranged externally of the covering-tube of the telescopic guides and between the projecting top piece and the body of the chandelier.

5. The combination, substantially as before set forth, of the body of the chandelier, the telescopic guides, the top piece, the helical metallic springs, arranged as described, the locking device, and the handle for operating the same, arranged at the level of the body of the chandelier.

In witness whereof we have hereunto set our hands this 6th day of July, A. D. 1878.

WALTER HUBBARD,
*President of the Bradley & Hubbard Mfg. Co.*
GEORGE W. LYON,
*President of the Meriden Malleable Iron Co.*

Witnesses:
GEORGE A. FAY,
CHARLES P. IVES.